(No Model.)  
H. SKILLINGS.  
SPADE WHEEL PLOW.

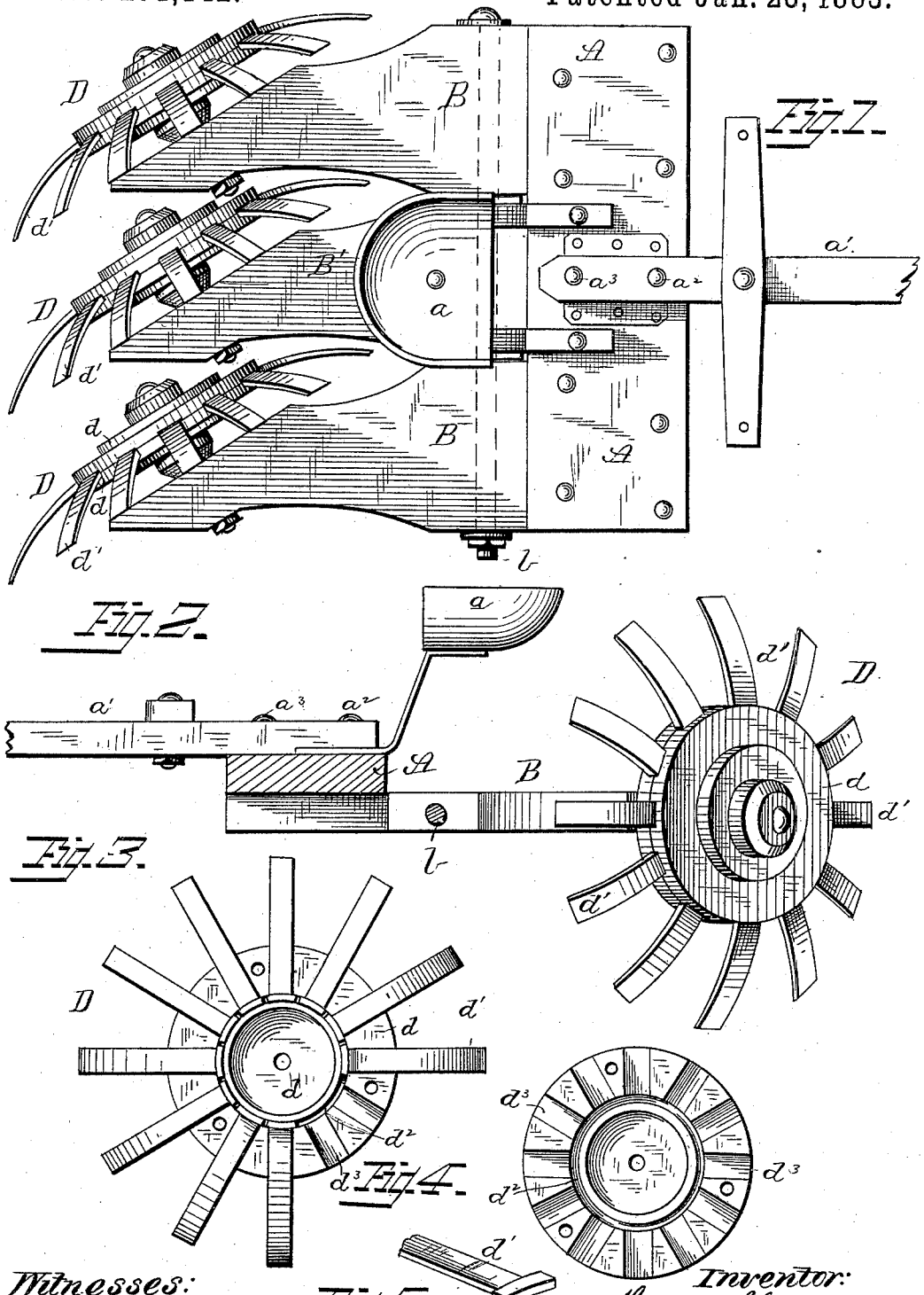

No. 271,142. Patented Jan. 23, 1883.

WITNESSES.  
Saml R. Turner  
W. J. Osgood

INVENTOR.  
Hiram Skillings  
Howard A. Snow  
ATT'Y.

UNITED STATES PATENT OFFICE.

HIRAM SKILLINGS, OF NEW BEDFORD, MASSACHUSETTS.

SPADE-WHEEL PLOW.

SPECIFICATION forming part of Letters Patent No. 271,142, dated January 23, 1883.

Application filed October 3, 1882. (No model.)

*To all whom it may concern:*

Be it known that I, HIRAM SKILLINGS, a citizen of the United States, residing at New Bedford, in the county of Bristol and State of Massachusetts, have invented certain new and useful Improvements in Spade-Wheel Plows, of which the following is a specification, reference being had therein to the accompanying drawings.

My invention relates to spade-wheel plows; and it consists in the construction and arrangement of its several parts, as will be hereinafter fully set forth, and pointed out in the claim.

Figure 6:
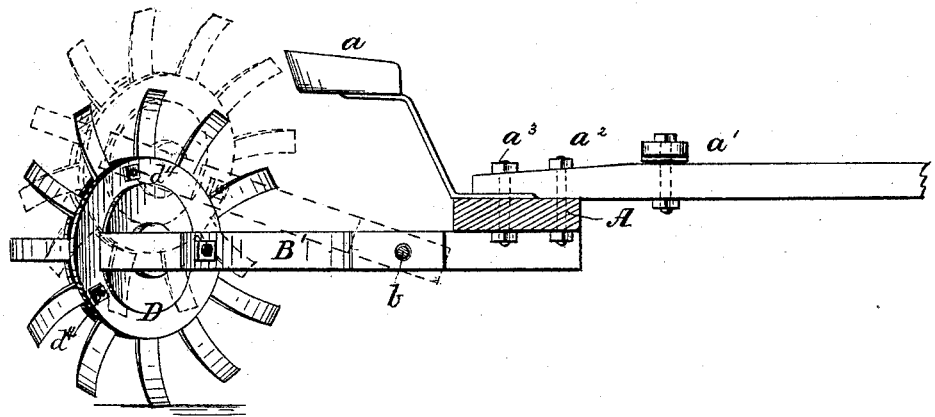
Figure 7:
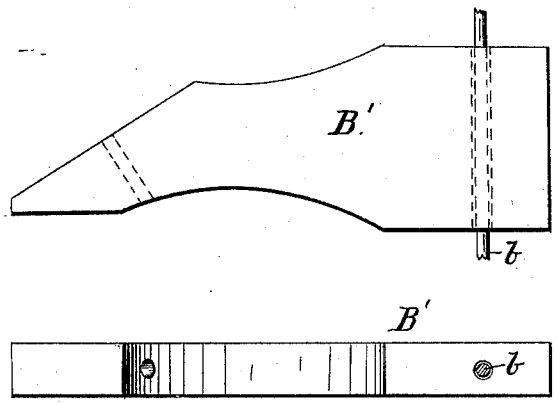

In the drawings, Figure 1 is a top plan view; Fig. 2, a side elevation, partly in section; Fig. 3, an elevation of one of the spade-wheels with the face-plate removed; Fig. 4, a view of the face-plate; and Fig. 5, a perspective showing the base of one of the teeth. Fig. 6 is a vertical section, showing the adjustability of the middle section or support. Fig. 7 is a detail of the adjustable support.

The frame to which the operating mechanism is secured may be of such material and construction as experience may find best suited for the purpose.

In order to clearly illustrate the invention, I have shown an ordinary sill or broad bar, A, to which the mechanism is attached. Secured to the sill A is the seat $a$ and the tongue $a'$, which is secured by the pin $a^2$, and is capable of lateral adjustment by means of the pin $a^3$, which can be placed in any one of a series of holes in the sill.

Secured horizontally to the rear of the sill, and at right angles to it, are the spade-wheel supports B, and hinged between them by the shaft $b$, or by other suitable mechanism, is the support B', as shown. These supports are of peculiar shape. Spaces are cut between them in which the spade-wheels revolve, and the sides to which said wheels are axled are cut to an angle of about thirty degrees with the direction of the supports, as shown in Fig. 1.

Secured to the angled sides of the supports upon suitable axles are the spade-wheels D, which consist each of two circular disks, $d$, and curved teeth or spades $d'$, as shown. The disks each have an annular groove, $d^2$, cut in their faces, and from equal points around the circumference of which extend the mortises $d^3$, for the reception of the teeth or spades, as shown. The teeth or spades have T-shaped ends which enter the grooves $d^2$, the body of the teeth resting in the mortises $d^3$, as shown. The portions of the teeth which project from the mortises are curved over toward the supports to which they are respectively axled. When all the teeth are in place upon one of the disks, the other is placed over and the two bolted together by the bolts $d^4$, (see Fig. 6,) thus holding the spades firmly in place.

The advantages of the construction shown and described are that it does its work in a more satisfactory manner and with less expenditure of power than an ordinary moldboard plow, and that by having the middle support hinged the machine can easily pass over obstructions.

The special advantages of the construction of the spade-wheels are that the spades dig into the soil and turn the dirt over very thoroughly, and pulverize when they turn out in the revolutions of the wheel; and also that part of the teeth in the ground will hold the plow from turning sidewise during the entrance of the other tooth, thus making each wheel an independent plow in effect.

What I claim is—

In a revolving plow, the combination, with the sill A and journal-shaft $b$, of the angular supports B B B', each provided at its rear end with the diagonally-arranged spade-wheel, the supports B B being rigidly secured to the sill, and the support B' hinged to the shaft $b$, substantially as described.

In testimony whereof I hereby affix my signature in presence of witnesses.

HIRAM SKILLINGS.

Witnesses:
ARTHUR E. PERRY,
JOHN W. NUTTWOOD,
WILLIAM B. SMITH.